Figure 3:
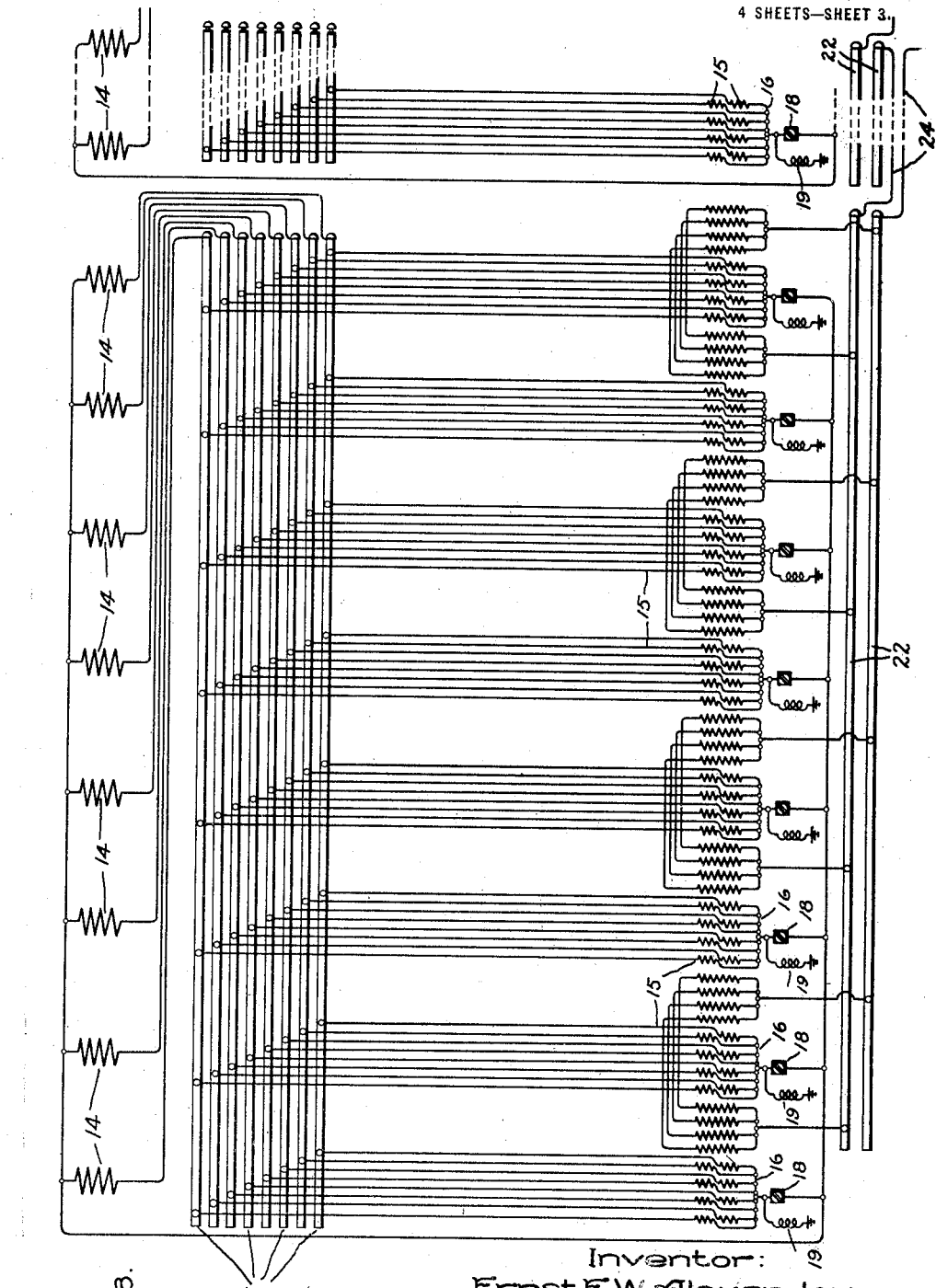

E. F. W. ALEXANDERSON.
SYSTEM OF ELECTRICAL DISTRIBUTION.
APPLICATION FILED OCT. 6, 1917.
1,375,991.
Patented Apr. 26, 1921.
4 SHEETS—SHEET 1.
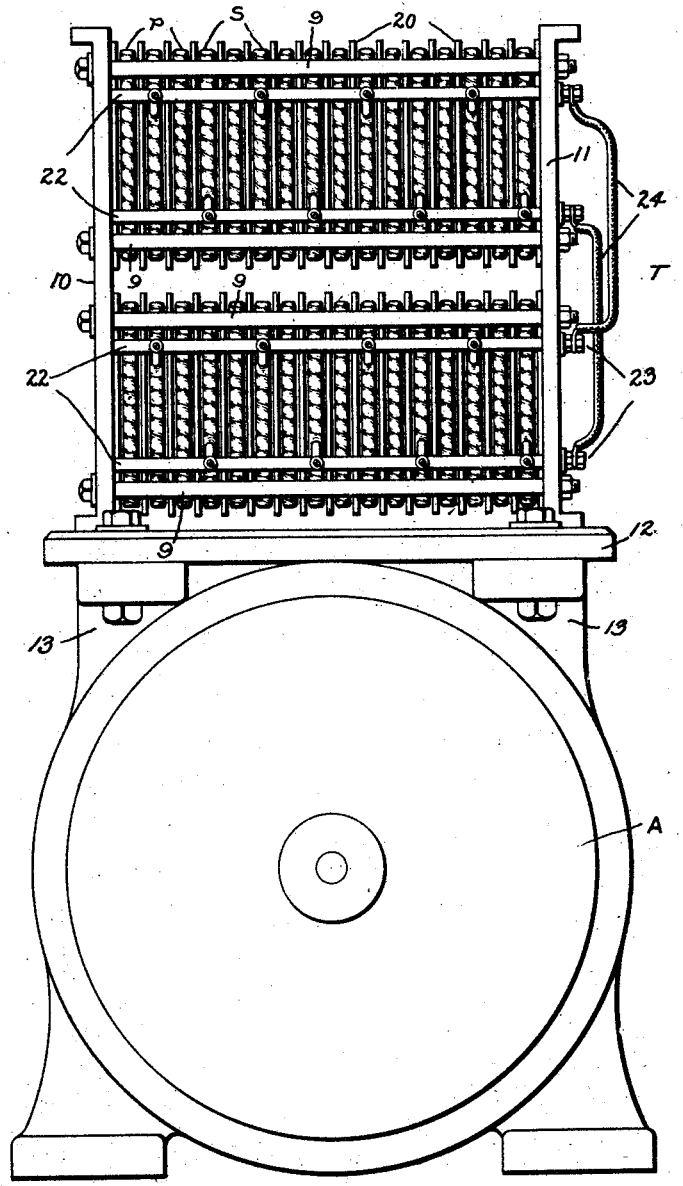
Inventor:
Ernst F. W. Alexanderson,
by Albert G. Davis
His Attorney.

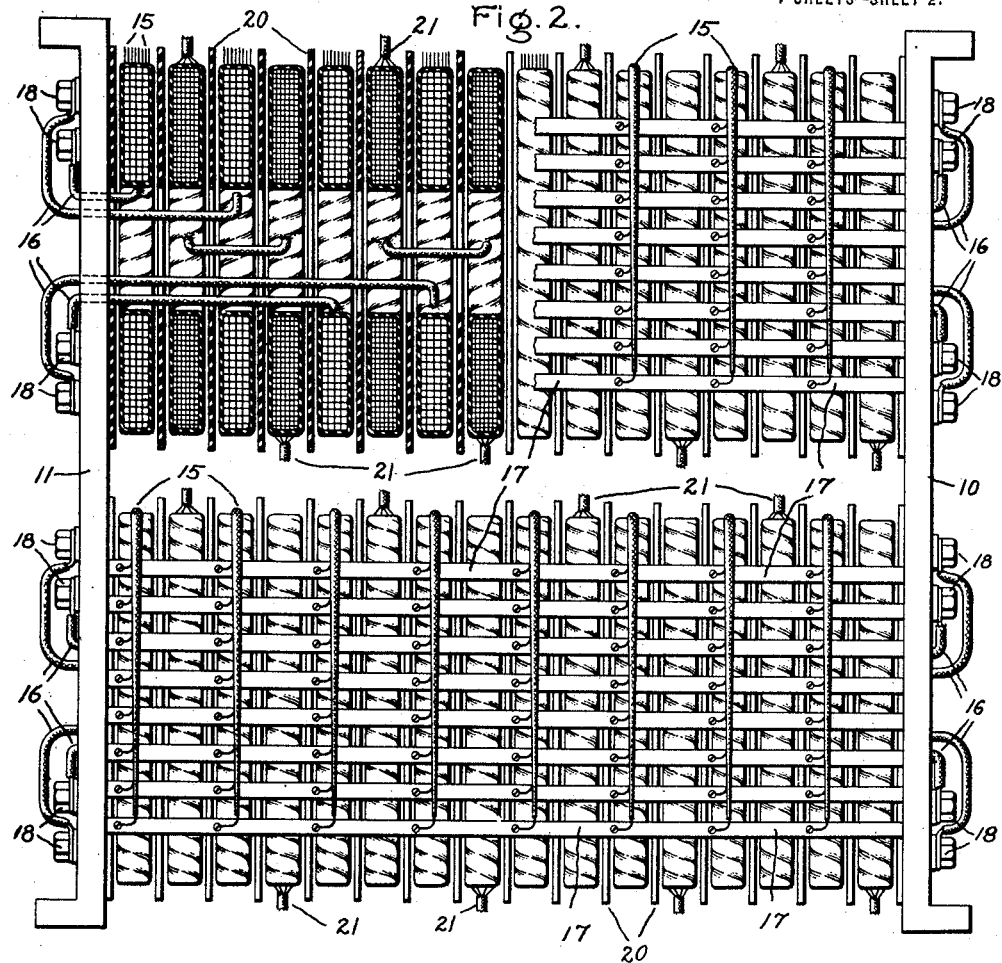
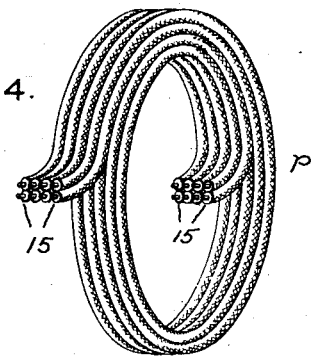
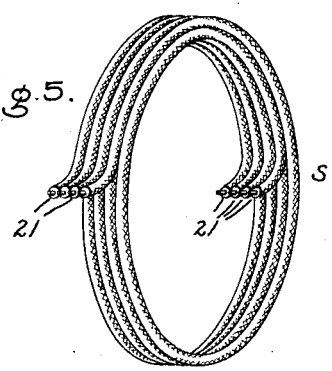

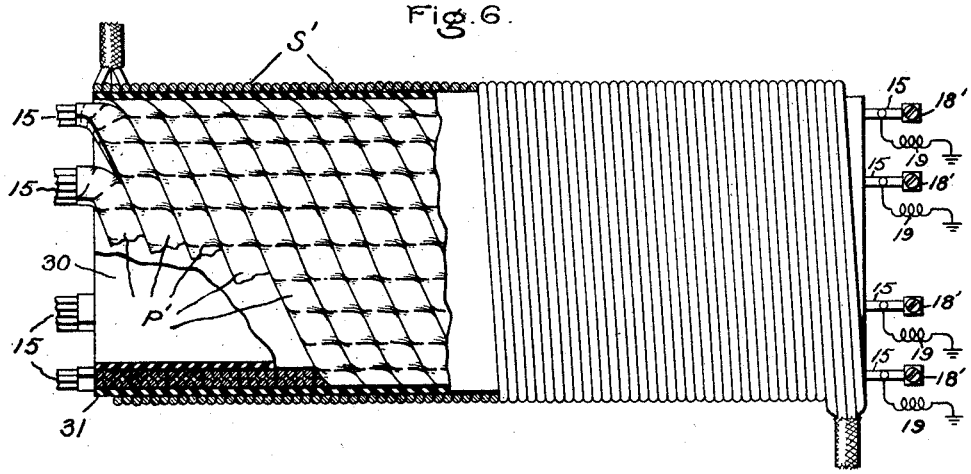
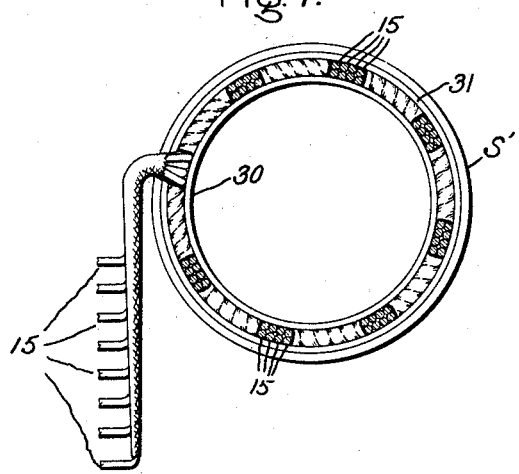

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

1,375,991.  Specification of Letters Patent.  Patented Apr. 26, 1921.

Application filed October 6, 1917. Serial No. 195,022.

*To all whom it may concern:*

Be it known that I, ERNST F. W. ALEXANDERSON, a citizen of the United States, residing at Schenectady, in the county of Schenectady, State of New York, have invented certain new and useful Improvements in Systems of Electrical Distribution, of which the following is a specification.

My invention relates to systems of electrical distribution and more particularly to apparatus for generating and distributing alternating current electric energy of high frequency and has for its main object the provision of an improved apparatus for this purpose.

In systems of electrical distribution employing high frequency alternating current energy generated directly by a dynamo-electric machine operating on the principle of a simple alternator, it is customary to interpose a high frequency transformer between the dynamo-electric machine and the load circuit, because it is not generally advantageous to directly generate in the armature winding of the dynamo-electric machine such high electromotive forces as such a system usually requires. For example, in a system of radio communication, the high frequency alternator is usually connected to the antenna by means of a step-up transformer designed for radio frequencies. Where relatively large amounts of electric energy are thus to be generated, transformed and distributed, the armature current of the dynamo-electric machine becomes relatively large, because of the relatively low voltage design of the armature winding, and I have found it necessary in such cases to provide a special construction and arrangement of both the high frequency alternator and the step-up transformer. For example, I have discovered that special precaution must be taken to prevent the flow of cross currents in the armature winding of the high frequency alternator and also to prevent the occurrence of excessive static potentials on the armature winding. The principal object of the present invention is then to provide an improved combination of high frequency alternator and step-up transformer for generating and distributing relatively large amounts of alternating current electric energy of high frequency. In carrying out the invention, I group the armature winding of the high frequency alternator into a plurality of separate and independent armature circuits and I selectively connect these independent armature circuits to corresponding independent primary circuits of a step-up transformer so that each primary circuit is in a completed or closed electric circuit with only one armature circuit. By this improved arrangement, the current flowing in any independent armature circuit cannot find a direct electrical path to any other armature circuit, and cross currents cannot, therefore, directly flow from one armature circuit to another. Each primary circuit of the transformer is connected to ground, preferably through a suitable reactance, and since each primary circuit is included in a closed electric circuit with an armature circuit, each armature circuit is in effect itself grounded and no excessive static potential can therefore occur on the armature winding on account of capacity currents which easily flow from one insulated circuit to another in a system employing high frequency alternating current energy. The broad principle of the invention of selectively connecting a plurality of independent armature circuits to a plurality of independent primary circuits of a transformer so that each primary circuit is in effect included in a completed electric circuit with only one armature circuit may be embodied in various forms and types of apparatus. In the forms of the invention which I will hereinafter particularly describe, I have found it advantageous to construct the primary winding of the transformer of a plurality of coils and to wind each primary coil of as many independent electric conductors or circuits as there are independent armature circuits. Thus, where the armature winding of a high frequency alternator is divided into groups each containing $n$ independent armature circuits, each primary coil is composed of $n$ independent conductors or circuits. These $n$ independent conductors or primary circuits are preferably united together as a cable of $n$ strands and wound as a single unit. The $n$ independent conductors or primary circuits of each primary coil are then selectively connected to the $n$ independent armature circuits so as to impede the direct flow of electric current from any armature circuit to any other armature circuit.

The novel features of the invention which I believe to be patentable are definitely indicated in the appended claims. The arrangement and construction as well as the mode of operation of apparatus embodying the invention will be best understood from the following description taken in conjunction with the accompanying drawings, in which:

Figure 1 is an elevation of a high frequency alternator and transformer embodying the principles of the present invention; Fig. 2 is an enlarged elevation, partly in section, of the transformer shown in Fig. 1; Fig. 3 is a diagram of the electrical connections of the apparatus of Fig. 1; Fig. 4 is a perspective view showing the winding of the primary coils of the transformer; Fig. 5 is a perspective view of the winding of the secondary coils of the transformer; and Figs. 6 and 7 are views of a modified transformer construction.

The apparatus illustrated in Fig. 1 comprises a high frequency alternator A and a transformer indicated generally by reference character T. The high frequency alternator illustrated in Fig. 1 is of the inductor type, and is preferably of the same general construction as I have described in Letters Patent of the United States already granted to me, of which I mention No. 1,008,577, patented Nov. 14, 1911, as an example. This alternator has a rotatably mounted inductor designed for rotation at high speeds and a stationary armature winding in which are induced alternating electromotive forces of high frequency. In accordance with the present invention, the armature winding of the alternator is divided into a plurality of independent circuits, as will be more fully described in connection with Fig. 3 of the drawings. The transformer T is preferably mounted on top of the alternator A, and in Fig. 1 of the drawings, I have shown the base of the transformer bolted to brackets on the casing of the alternator. The transformer is of the air-core type, and is especially designed for transforming alternating current energy of radio frequency, such as is produced by the high frequency alternator A. In fact, the apparatus of Fig. 1 is especially designed for use in systems of radio communication, in which systems the secondary winding of the transformer T is connected to the antenna.

The transformer T illustrated in the accompanying drawings comprises two vertical or upright standards 10 and 11 suitably secured to a base 12. The standards 10 and 11 are suitably held together in their proper positions by rods 9. The standards and base are of insulating material and may advantageously be made of wood. In the apparatus of Fig. 1, the base 12 is bolted to brackets 13 on the top of the casing of the alternator A. Fig. 1 shows the secondary side of the transformer while Fig. 2 shows the other or primary side of the transformer.

The primary and secondary coils P and S of the transformer are mounted between the standards 10 and 11. The armature winding of the alternator A is divided into thirty-two circuits of which ten are represented by reference character 14 in Fig. 3 of the drawings. The thirty-two armature circuits 14 are arranged in four groups of eight each, and since the arrangement and electrical connections of each group of eight circuits are substantially the same the connections of only one group are completely shown in Fig. 3. The coils of the transformer T are arranged in four units or groups, each unit containing eight primary coils P and eight secondary coils S. The eight primary coils P of each unit of the transformer are alternately arranged with respect to the eight secondary coils S thereof. Only two of the four units of transformer coils are shown in Figs. 1 and 2 of the drawings, but it will be understood that two similar units of sixteen coils each are located directly behind the two units of coils shown in elevation in Fig. 1. I do not wish to be limited to the particular number or arrangement of primary and secondary transformer coils or to the particular number of independent conductors or circuits thereof, illustrated in the accompanying drawings, since it will be understood by those skilled in the art that the principles of the present invention may be embodied in a transformer having a greater or a smaller number of primary and secondary coils and with different arrangements of the coils and independent circuits thereof than illustrated and described herein.

In the modification of the invention illustrated in the accompanying drawings, each primary coil P is composed of eight independent conductors 15. These eight conductors are arranged in two layers with four in each layer and wound as a single unit, as clearly illustrated in Fig. 4 of the drawings. At one end, the eight conductors 15 of each coil P are electrically connected together as diagrammatically indicated by the connections 16 in Fig. 3 of the drawings. At their other ends the eight conductors 15 of each coil P are independently connected to eight bus bars 17 arranged one above the other on the primary side of the transformer T, as will be clearly understood by reference to Fig. 2 of the drawings. The bus bars 17 are independently connected to one terminal of the eight independent circuits 14 of one group of the armature winding of the alternator A. The other terminals of the eight armature circuits 14 are electrically connected together and to the common connections 16 of each of the primary coils P. The common connections 16 of the primary coils P are brought out through the center of the coils and fastened to binding posts 18 on the standards 10 and 11, there being four binding posts 18 on each standard for each transformer unit. The eight binding posts 18 of each transformer unit are then electrically connected to the common terminal of the eight armature circuits 14, as diagrammatically indicated in Fig. 3 of the drawings. A reactance 19 is connected between the common connection 16 of each primary coil P and ground, whereby each of the eight conductors 15 is connected to ground through the reactance 19 and each armature circuit 14 is similarly connected to ground through a reactance 19. The primary and secondary coils P and S are alternately arranged, and are separated from one another by a disk of insulating material 20. There is, furthermore, a narrow air-gap between each insulating disk 20 and the two adjacent transformer coils, as will be clearly seen by reference to Fig. 2 of the drawings. Each secondary coil S consists of four conductors 21 wound in a single layer, as illustrated in Fig. 5 of the drawings. At their inner ends, the four conductors 21 of the secondary coils S are connected together in pairs, as illustrated in Figs. 2 and 3 of the drawings. Thus, the four conductors 21 of each secondary coil are connected to the four corresponding conductors 21 of an adjacent secondary coil S. At their outer or other ends the pairs of secondary coils S are connected to the secondary bus bars 22. Thus, the four conductors 21 of each secondary coil S are connected in parallel with one another and in series with the four parallel-connected conductors 21 of an adjacent secondary coil S. In the arrangement illustrated in Fig. 3 of the drawings, the four pairs of secondary coils S of each transformer unit are connected in parallel across the bus bars 22. It will, of course, be understood, however, that these four pairs of coils may be otherwise connected together. The secondary bus bars 22 are mounted between the standards 10 and 11 and are on the opposite side of the transformer coils P and S from the primary bus bars 17. In the four-unit transformer T of the apparatus of Fig. 1, there will be four sets of secondary bus bars 22. These bus bars have terminals 23, and in the drawings cables 24 have been illustrated for connecting the four sets of bus bars 22 together. It will, of course, be understood that the four sets of bus bars 22 may be connected together in series, or in parallel, or in series-parallel.

From the foregoing description it will be evident that each conductor 15 of each primary coil P constitutes an independent primary circuit which is in effect connected in a completed electric circuit with only one armature circuit 14. In other words, the electric current flowing in any particular conductor can flow in one and only one armature circuit 14. By this arrangement, the direct flow of cross currents from one armature circuit to another is effectively prevented. It will be seen that corresponding conductors of the primary coils of each unit of the transformer are connected in parallel with one another and in series relation with their corresponding armature circuit. Thus, the eight conductors 15 which are connected to the same bus bar 17 are electrically connected in parallel with one another and in series with the armature circuit 14 which is connected to this same bus bar. Each primary circuit or conductor 15 is connected to ground through an inductance 19, whereby the voltage to ground of any part of the armature or primary circuits is limited. This limits the static potential which can exist on either the armature or primary windings of the apparatus.

High frequency alternators of the type employed in the apparatus of the present invention are constructed with special precaution in order to make the voltages generated in the different circuits of the armature winding equal in magnitude and in phase. In spite of such precautions it is practically impossible in commercial factory practice to construct such a machine with so little inaccuracy that there is no material difference of voltage in the different armature circuits. This difficulty is to a very large extent overcome by the arrangement and connection of transformer primary circuits and armature circuits of the present invention, since each armature circuit is in effect electrically independent of the other armature circuits, and inequalities in the voltages of the various armature circuits will not, therefore, result in the flow of cross currents from one armature circuit to another.

While direct cross currents between the armature circuits are made entirely impossible by having the circuits electrically separated in accordance with the principles of the present invention, the possibility of cross currents is not entirely avoided because the armature circuits are magnetically interlinked through the primary circuits of the transformer. Although the cross currents are very considerably, and for most purposes sufficiently, reduced in magnitude by electrically separating the armature circuits, a still further reduction in the magnitude of the cross currents can be effected where desired or necessary by magnetically separating those circuits in which the magnitude and phase of the voltages are such as to cause the flow of relatively large cross currents. To this end, the magnitude and phase of the voltages in all the different armature circuits are measured and the circuits are divided up into two or four groups so that those circuits which are included in the same group generate voltages which are most nearly alike in both magnitude and phase. These groups of armature circuits are then connected to two or four independent transformers, the fluxes of which are not at all or practically not interlinked with each other so that no cross current can occur between the different groups. If the secondary windings are connected in series, it will be apparent that no cross currents will flow as a result of transformation between the transformer windings as might be the case if the secondary windings of the different groups were connected in multiple. It will further be apparent that inasmuch as the secondary circuits of the different groups are connected in series, all groups carry the same secondary current, and, consequently, the current load is divided equally on all the primary groups of coils, even though the voltages may not be in phase. The result will be that the current being more leading in one group than in another with reference to the voltage generated, the inductive rise of potential will be different in the different groups, whereas the current will be the same.

Another advantage of the arrangement of armature and transformer windings of the present invention is the greater reliability of the apparatus. If any independent armature circuit should become damaged, sufficient current may eventually flow from the transformer into the damaged armature circuit to burn off the conductor, but in such a case only a small portion of the machine is thereby put out of commission, because all of the other armature circuits can continue to do service as before without any interference with their operation. Thus, it is possible in case of an accident to continue to operate a machine whose armature winding is damaged to a considerable extent, the only disadvantage being that the output of the machine is reduced in proportion to the number of armature circuits that are out of commission.

The principles of the present invention may be embodied in various forms of apparatus. In Figs. 6 and 7 I have illustrated a modification of the transformer construction which possesses some advantages in certain cases. The convolutions of the primary coils P' of this modified transformer are spiraled instead of concentric as in the case of the coils P. Each primary coil P' is composed of eight conductors 15 which, for convenience of illustration and explanation, are shown in Figs. 6 and 7 as united in a single cable of two layers with four conductors in a layer. This cable of eight conductors is spirally wound on a hollow cylinder of insulating material 30. At one end (the left-hand end of Fig. 6) the eight conductors 15 of each primary coil P' are selectively connected to eight primary bus bars corresponding to the primary bus bars 17, and at their other ends the eight conductors 15 are connected together and to a terminal binding post 18' corresponding to binding post 18. Electrically, the spiral coils P' are thus connected exactly the same as the primary coils P. In Figs. 6 and 7 of the drawings, I have shown eight primary coils P' spirally wound side by side on the insulating cylinder 30, and these eight primary coils are each electrically connected to eight independent armature circuits just as the corresponding eight primary coils P of one unit of the transformer T are connected The resulting two-layer primary winding consisting of the coils P' is covered by a shell 31 of insulating material and on this is wound the secondary winding S' of the transformer. This secondary winding S' may be wound of a single conductor, or of two or more conductors so as to obtain different secondary voltages, if desired. In Fig. 6, I have shown the secondary winding S' wound of four conductors in parallel, these four conductors being arranged in one layer and spirally wound as a single unit or cable on the insulating shell 31. By this construction it will be observed that every conductor or primary circuit 15 is magnetically interlinked with the single secondary winding.

I have herein shown and particularly described certain embodiments of my invention for the purpose of explaining its principle and showing its application, but numerous modifications of the details of construction and arrangement of these embodiments and other applications will present themselves to those skilled in the art. I, therefore, wish to cover by the following claims all modifications within the spirit of the invention.

What I claim as new and desire to secure by Letters Patent of the United States, is:—

1. Apparatus for generating and distributing alternating current energy of high frequency comprising in combination, a high frequency alternator having a group of independent armature circuits, a transformer having a plurality of primary and secondary coils, each of said primary coils being wound of a plurality of independent conductors, and means for electrically connecting each conductor of each primary coil to an individual armature circuit so that each conductor is directly connected in a complete electric circuit with only one armature circuit and each armature circuit is connected to only one conductor of each primary coil.

2. Apparatus for generating and distributing alternating current energy of high frequency comprising in combination, a high frequency alternator having a group of independent armature circuits, a transformer having a plurality of primary and secondary coils, each of said primary coils being wound of as many independent conductors as there are independent armature circuits in said group, means selectively connecting one terminal of each of said armature circuits to one terminal of one conductor of each of said primary coils so that each conductor of every primary coil is thereby connected to only one armature circuit, and means connecting the other terminals of said armature circuits to the other terminals of the conductors electrically connected thereto by said last mentioned means.

3. Apparatus for generating and distributing alternating current energy of high frequency comprising in combination, a high frequency alternator having a group of independent armature circuits, an independent bus bar electrically connected to one terminal of each of said armature circuits, a transformer having a plurality of primary and secondary coils, each of said primary coils being wound of as many independent conductors as there are independent armature circuits in said group, means selectively connecting the conductors of each primary coil to said bus bar so that the conductors of each coil are thereby connected to different bus bars, and means for completing the electric circuits of said armature circuits and said conductors.

4. Apparatus for generating and distributing alternating current energy of high frequency comprising in combination, a high frequency alternator having a group of $n$ independent armature circuits, a transformer having a primary coil composed of $n$ independent primary circuits and a secondary circuit inductively related thereto, means electrically connecting one terminal of each of said $n$ armature circuits to one terminal of each of said $n$ primary circuits so that each primary circuit is thereby connected in series with one and only one armature circuit, and each armature circuit is connected to only one primary circuit of said primary coil and means electrically connecting the other terminal of each primary circuit to the other terminal of the armature circuit to which this primary circuit is connected by said last mentioned means.

5. Apparatus for generating and distributing alternating current energy of high frequency comprising in combination, a high frequency alternator having a group of independent armature circuits, a transformer having an independent primary circuit for each of said armature circuits and a secondary circuit inductively related thereto, means electrically connecting one terminal of each of said armature circuits to one terminal of each of said primary circuits so that each primary circuit is thereby connected in series with one and only one armature circuit, a connection common to all of the circuits for electrically connecting the other terminal of each primary circuit to the other terminal of the armature circuit to which this primary circuit is connected by said last mentioned means, and means including an inductance for connecting each of said primary circuits to ground.

6. Apparatus for generating and distributing alternating current energy of high frequency comprising in combination a high frequency alternator having a group of independent armature circuits, a transformer having an independent primary circuit for each of said armature circuits and a secondary circuit inductively related thereto, means electrically connecting one terminal of each of said armature circuits to one terminal of each of said primary circuits so that each primary circuit is thereby connected in series with one and only one armature circuit, means electrically connecting all of the other terminals of said armature circuits together and to the other terminals of said primary circuits, and an inductance electrically connected between said last mentioned means and ground.

7. Apparatus for generating and distributing alternating current energy of high frequency comprising in combination a high frequency alternator having a group of independent armature circuits, a transformer having a plurality of independent primary circuits and a secondary circuit inductively related thereto, means electrically connecting one terminal of each of said armature circuits to one terminal of each of said primary circuits so that each primary circuit is thereby connected in series with one and only one armature circuit, and a common connection for electrically completing all of the circuits of the armature and primary circuits which are connected in series by said last mentioned means.

8. Apparatus for generating and distributing alternating current energy of high frequency comprising in combination, a high frequency alternator having a plurality of groups of independent armature circuits, a transformer having a plurality of groups of independent primary circuits and a secondary winding inductively related to each group, means selectively connecting one terminal of each of said armature circuits of each group to one terminal of one of said primary circuits of a corresponding group so that each primary circuit is thereby connected in series with one and only one armature circuit, and a common connection for electrically completing all of the circuits of the armature and primary circuits of each group which are connected in series by said last mentioned means.

In witness whereof, I have hereunto set my hand this 4th day of October, 1917.

ERNST F. W. ALEXANDERSON.